United States Patent Office 3,167,537
Patented Jan. 26, 1965

3,167,537
AZO DYESTUFFS AND THEIR METAL
COMPLEX COMPOUNDS
Karl-Heinz Menzel, Cologne-Mulheim, Rolf Pütter, Dusseldorf, and Gerhard Wolfrum, Opladen, Germany, assignors to Farbenfabriken Bayer Aktiengesellschaft, Leverkusen, Germany, a corporation of Germany
No Drawing. Filed Sept. 2, 1960, Ser. No. 53,611
Claims priority, application Germany Sept. 5, 1959
8 Claims. (Cl. 260—146)

The invention relates to new heterocyclic compounds; it further relates to azo dyestuffs and to their metal complex compounds.

An object of the present invention are azo dyestuffs of the general formula

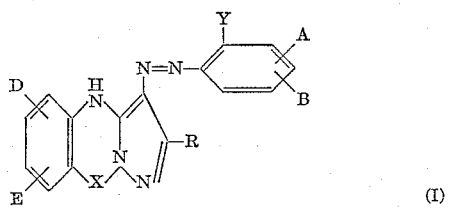

(I)

and their metal complex compounds. In the formula, A, B, D and E represent hydrogen or various substituents usual in azo dyestuffs which may be identical or different from one another—e.g., halogen and nitro-, acylamino-, alkoxy, carboxylic acid, sulphonic acid, sulphonamide or sulphone groups, R represents hydrogen or an alkyl, aryl, carboxylic acid, carboxylic acid amide or carboxylic acid ester group, X represents a direct linkage or the group

Y represents a metal complex forming group such as OH or COOH or a radical which can be transformed into such a group, such as $OCH_3$, H, $SO_3H$ etc.

The alkyl or aryl radicals of the substituents R can be further substituted.

The metal complex compounds of the present invention are obtained by metallizing azo dyestuffs of the aforesaid general Formula I in a manner known as such in substance or on the fibre. For this purpose one can proceed for example by reacting dyestuffs of the aforesaid general formula in which Y represents a group capable of complex formation or a grouping capable of being transformed in such a group with salts of copper, chromium, cobalt or nickel. If the reaction with copper salts is carried out in the presence of oxidation agents, there can also be used dyestuffs of the aforesaid formula in which Y represents hydrogen, since in these cases the hydrogen atom is exchanged for a hydroxyl group. As metallizing agent there may also be used complex forming compounds which already contain one chromium atom per dyestuff molecule in complex linkage and which react with one molecule of a metal-free dyestuff of the Formula I with the formation of mixed 1:2 chromium complex dyestuffs.

Azo dyestuffs of the general Formula I can be produced by coupling diazonium compounds of amines of the formula

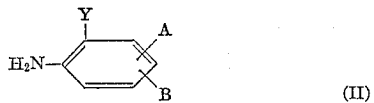

(II)

in which A, B and Y have the above given significance, with pyrazolo-benzimidazoles or pyrazolo-quinazolones.

Suitable amines for the preparation of the diazonium compounds are, e.g., 1-amino-2-hydroxy-benzene, 1-amino - 2-hydroxy-4-nitrobenzene, 1-amino-2-hydroxy-4-chloro-benzene, 3-amino-4-hydroxy benzene-sulphonic acid-(1), 3-amino-4-hydroxy-5-chloro benzene-sulphonic acid-(1), 3-amino-4-hydroxy-benzene sulphonamide-(1), 4-amino-3-hydroxy benzene sulphonamide-(1), and their derivatives substituted at the sulphonamide nitrogen by one or two organic radicals, ethyl-(3-amino-4-hydroxyphenyl) sulphone, amino-hydroquinone methylene-sulphone ether, anthranilic acid, sulphoanthranilic acid, anthranilic acid sulphonamide and their derivatives substituted at the amide nitrogen by organic radicals, and furthermore sulphanilic acid, 3-amino-4-methoxy-benzene sulphonamide-(1) and 1-amino-2-chloro-5-nitro-benzene.

Suitable pyrazolo-benzimidazoles or pyrazoloquinazolones are e.g. the following: 3'-methylpyrazolo-[1',5':1, 2]-benzimidazole, 3'-carboxypyrazolo-[1',5':1,2] - benzimidazole, 3'-methylpyrazolo-[1',5':1,2] - benzimidazole-sulphonic acid-(5) or -(6), 3'-methylpyrazolo-[1',5':1,2] 5-methylbenzimidazole, 3' - methylpyrazolo - [1',5':1,2] benzimidazole-sulphonamide-(5), 3'-methylpyrazolo-[5', 1':2,3]-quinazolone, 3'-carboxypyrazolo-[5',1':2,3]-quinazolone, 3' - methylpyrazolo-[5',1':2,3]-5-chloroquinazolone, 3'-phenylpyrazolo-[5',1':2,3]-quinazolone, 3'-methylpyrazolo-[5',1':2,3]-quinazolone - sulphonic acid-(6). The pyrazolo-benzimidazoles can be produced according to the process described in Belgian patent specification 579,898.

Pyrazolo-(1',5':3,2)-quinazolones, among which there are many which can be used for the production of dyestuffs of the Formula I, are new and likewise an object of the present invention. They correspond to the apparent general formula

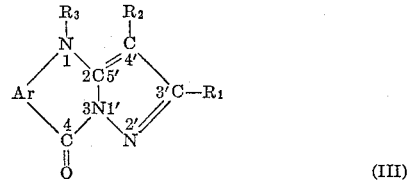

(III)

Therein denote:

$R_1$: hydrogen, an optionally substituted alkyl radical, an optionally substituted aryl radical, a carboxylic acid group, carboxylic ester or carboxylic acid amide group;

$R_2$: hydrogen, an alkyl, cycloalkyl, aralkyl or aryl radical;

$R_3$: hydrogen or an optionally substituted alkyl, cycloalkyl or aryl radical;

Ar: an ortho-condensed, mono- or polynuclear, optionally substituted aromatic ring system. The pyrazoloquinazolones of Formula III can be produced in that aromatic o-amino carboxylic acid hydrazides which carry at the nitrogen of the amino group at least one hydrogen atom, are reacted with β-oxo carboxylic acid esters.

From the aromatic o-amino carboxylic acid hydrazides and the β-oxo carboxylic acid esters there may first result the corresponding hydrazones with splitting off of a mol of water, and these in the further course of the reaction are cyclized with splitting off of alcohol or an aromatic hydroxy compound and a second molecule of water, to give the end products. The course of the reaction described is illustrated in the following equations exemplified by the reaction of anthranilic acid hydrazide with acetoacetic acid ethyl ester to give 3'-methyl-pyrazolo-(1',5':3,2) quinazolone;

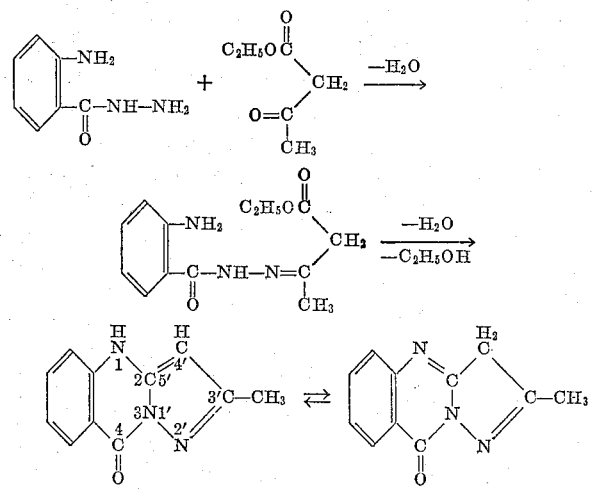

For the production of the compounds of Formula III the starting components are preferably used in equimolar quantities. As reaction medium, according to the solubility of the components there come into consideration water or organic solvents such as, e.g., methanol, ethanol, glycol monomethyl ether, dimethyl formamide or acetonitrile. It is, however, also possible to work without a solvent. The reaction, which takes an exothermic course, occurs in general without further application of heat. In some cases the production of the pyrazolo quinazolones can be carried out in neutral or weakly acid medium; often indeed the second step of the reaction, the cyclization of the hydrazone, proceeds only in the presence of alkalies, such as soda, potash, borax, magnesium oxide or organic bases, which are added to the reaction mixture at the outset or only after formation of the hydrazones.

It is unnecessary to isolate the hydrazones occurring as an intermediate step, which are, moreover, mostly soluble. The process for producing compounds of the Formula III can on the contrary even be carried out in a single operation. At the final stage the often almost quantitative yield of pyrazolo-quinazolone produced is filtered off, washed on the filter first with the solvent used in the reaction and then with hot water, and then dried. The products thus obtained which for the most part contain only slight impurities, are with few exceptions difficultly soluble in most organic solvents, but can be recrystallized, however, from dimethyl formamide, glycol monomethyl ether or a mixture of the latter with pyrrolidone. In many cases the substance can be dissolved in hot aqueous hydrochloric acid, purified with charcoal and then precipitated by addition of sulphates or aromatic sulphonic acids as difficultly soluble salts, or their solution may be salted out in hot aqueous caustic soda with common salt.

According to the aforesaid process a great number of pyrazolo-quinazolones of the Formula III are easily obtainable, since o-amino aroyl hydrazides as well as β-oxo carboxylic acid esters are already known in great number in the literature or can be readily produced according to conventional methods. Thus for example there come into consideration for the reaction with β-oxocarboxylic esters the hydrazides of anthranilic acid, N-alkyl anthranilic acids, 2,3-amino naphthoic acid, N-alkyl-2,3-amino naphthoic acid, and their derivatives substituted one or more times in the aromatic nucleus for example by halogen, alkyl, alkoxy, aryl, phenoxy, amino, acylamino, alkyl amino, carboxyl, sulfonamide, or sulfonic acid groups or if necessary via bridge members by heterocyclic radicals; the following β-oxocarboxylic acid esters may be used, inter alia, acetoacetic acid ethyl ester, acetoacetic acid phenyl ester, acetoacetic acid cyclohexyl ester, acetoacetic acid benzyl ester, stearoyl-acetic acid ethyl ester, oxalacetic acid diethyl ester, benzoyl acetic acid ethyl ester, acetone dicarboxylic acid dimethyl ester or α-methyl acetoacetic acid ethyl ester.

According to the above process it is furthermore possible to obtain heterocyclic compounds with several pyrazoloquinazolone radicals, by starting from aromatic compounds which contain several amino groups and carboxylic acid hydrazide groups standing in ortho positions thereto the β-oxocarboxylic acid esters being added in quantities which are at least equivalent to the amino groups. As starting products there come into consideration, for example, aromatic compounds with several benzene nuceli of which each carries one amino group and a carboxylic acid hydrazide group standing into ortho positions thereto, for example benzidine-o-o'-dicarboxylic acid hydrazide.

The metal complex compounds of dyestuffs of the Formula I produced by using the pyrazolo-benzimidazoles or pyrazolo-quinazolones are according to the type of substituents present in the dyestuff, readily or slightly soluble or insoluble in water. The metal complex dyestuffs insoluble in water are suitable as pigments, whilst the water soluble metal complexes are especially suitable for dyeing animal and polyamide or polyurethane fibres; furthermore they can be fixed in the presence of alkali on cellulose fibres after introduction of reactive groups which are able to undergo chemical reaction with the hydroxyl groups of the cellulose fibre, such as mono or dichlorotriazinyl radicals, mono- or dichloro-pyrimidinyl radicals, halogen alkyl or halogen acyl radicals, —OSO$_3$H-groups or their alkali metal salts, expoxide groups etc.

The parts given in the following examples are parts by weight. The examples are to illustrate the invention without, however, limiting it thereto.

*Example 1*

18.8 parts of 1-amino-2-hydroxybenzene sulfonamide-(5) are dissolved in 75 parts of water and 30 parts of hydrochloric acid ($d=1.19$) and diazotized with the addition of ice at 0° C. with 7 parts of sodium nitrite in 15 parts of water. After removal of excess nitrous acid by means of amidosulphonic acid or urea a solution is added to the diazotization mixture of 17.1 parts of 3'-methyl pyrazolo-(1',5':1,2)-benzimidazole in 120 parts of 1 N hydrochloric acid and the mixture is run into 45 parts of caustic soda ($d=1.46$) and 50 parts of ice. After coupling is completed the dyestuff solution is clarified and after heating to 100° C. with good stirring, treated with a solution of 7.5 parts of potassium bichromate and 13.8 parts of glucose in 50 parts of water within 15 minutes. The reaction mixture is held for a short time at 100° C., allowed to cool to 70° C., and the resulting 2:1 chromium complex of the dyestuff of the formula

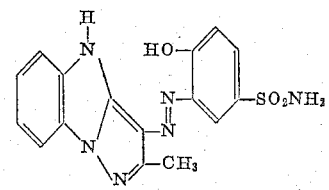

is separated by addition of sodium chloride, filtered off and dried. The ground powder obtained dissolves in water with red colour and dyes wool from an acetic acid bath in clear bluish red shades of good fastness properties.

The same chromium complex dyestuff is obtained if in the production of the metal free dyestuff, in place of the 1-amino-2-hydroxy benzene sulphonamide-(5) there is used as diazo component 1-amino-2-methoxy benzene sulphonamide-(5) and the monoazo dyestuff obtained is demethylated in chroming according to known processes (compare, e.g., French patent specification 1,083,204), e.g., with chromium formate in ethylene glycol or formamide at 140° C.

For the production of the cobalt complex dyestuff the solution obtained in the coupling of the monoazo dyestuff is heated to 80° C. and treated with 115 parts of the cobalt-containing solution described in the following. When dried the cobalt complex dyestuff is a dark brown powder which dissolves in water with a red colour; wool is dyed from an acetic acid bath in brick red shades with good fastness.

The cobalt containing solution used was prepared in the following manner.

A solution of 281 parts of crystalline cobalt sulphate in 1000 parts of water was treated with strong stirring with 500 parts of a 25% of aqueous ammonia solution; air was then blown through sufficiently long until a sample upon the addition of a 10% caustic soda solution gave no further precipitate. Finally the mixture was made up to 2000 parts with water.

Example 2

18.8 parts of 1-amino-2-hydroxy-benzene sulphonamide-(4) are coupled in the manner described in Example 1 with 3'-methylpyrazolo-(1',5':1,2)-benzimidazole to give the azo dyestuff of the formula

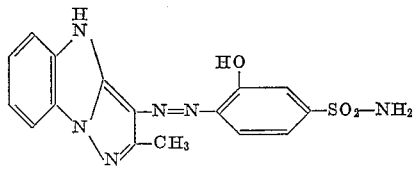

The azo dyestuff is then chromed with potassium bichromate and glucose. The chromium complex thus obtained is an almost black powder when dry which dissolves in water with a bluish red shade and dyes wool from a weakly acid bath in bluish bordeaux shades of good fastness properties.

The cobalt complex obtainable in an analogous manner according to the cobalting process of Example 1 is a brown powder which dissolves in water with a bluish red shade and dyes wool from a weak acid bath in clear bordeaux shades of good fastness properties.

Example 3

22.3 parts of 1-amino-2-hydroxy-3-chloro-benzene sulphonic acid-(5) are diazotized in the usual way and coupled in the manner described in Example 1 with 17.1 parts of 3'-methyl-pyrazolo - (1',5':1,2) - benzimidazole. After buffering the strongly alkaline coupling solution with acetic acid to a weakly alkaline reaction the azo dyestuff formed of the formula

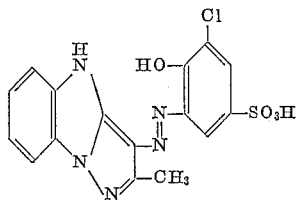

is separated by the addition of sodium chloride. It is a brown red powder when dry.

Wool is now dyed with this dyestuff in an acid bath at 100° C. in orange-yellow shades. The dyeing liquor is then treated with a potassium bichromate solution and heated for about another 45 minutes. The shade of colour thereby changes to a clear red of good fastness properties due to the formation of the chromium complex.

Example 4

18.9 parts of 1-amino-2-hydroxy-benzene sulphonic acid-(5) are diazotized in the usual way. The diazotization mixture is then added at 0° C. to a solution of 20.1 parts of pyrazolo - (1',5':1,2) - benzimidazole-carboxylic acid-(3') in 150 parts of water and 65 parts of caustic soda solution ($d=.1.46$). When coupling is completed the reaction solution is buffered with acetic acid and the dyestuff of the formula

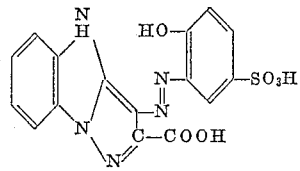

is separated by the addition of sodium chloride. When dry it represents a brick red powder.

Wool is dyed with this dyestuff in an acid bath at 100° C. in orange shades. The dyebath is then treated with a potassium bichromate solution and heated for about 45 minutes. A bordeaux dyeing is obtained of good fastness properties.

Example 5

21.7 parts of 5-sulpho-anthranilic acid are dissolved in 180 parts of water and 18 parts of a caustic soda solution ($d=1.46$) and after addition of 7 parts of sodium nitrite, treated in 25 parts of water and about 50 parts of ice with 35 parts of hydrochloric acid ($d=1.19$). After removing excess nitrous acid by means of amido sulphonic acid or urea a solution is added to the diazotization mixture of 17.1 parts of 3' - methyl - pyrazolo - (1',5':1,2)-benzimidazole in 120 parts of 1 N hydrochloric acid and the mixture is allowed to run into 275 parts of a 20% soda solution at 0–5° C. When coupling is completed the azo dyestuff formed of the formula

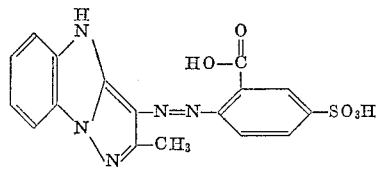

is precipitated by the addition of common salt.

Wool is dyed with this dyestuff in an acid bath at 100° C. in yellow shades. The dye bath is then treated with a potassium bichromate solution and heated for about 45 minutes. An orange-yellow dyeing is then obtained with good fastness properties.

Example 6

18.8 parts of 1-amino-2-hydroxy-benzene sulphonamide-(5) are dissolved in 75 parts of water and 30 parts of hydrochloric acid ($d=1.19$) and diazotized with the addition of ice at 0° C. This diazotization mixture is then added to a solution of 19.9 parts of 3'-methyl-pyrazolo-(1',5':3,2)-quinazolone in 120 parts of methanol, 15 parts of a caustic soda solution ($d=1.46$) and 30 parts of a 25% ammonia solution, whereby, by addition of ice, the temperature is maintained below 5° C. After coupling is completed the azo dyestuff formed of the formula

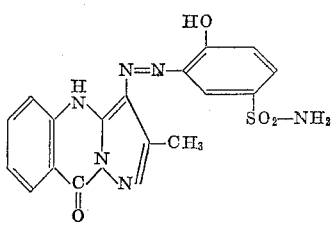

is separated by the addition of salt and then filtered off. For the production of the chromium complex the dyestuff is dissolved hot in 300 parts of water and 24 parts of a caustic soda solution ($d=1.46$) and the solution is boiled under reflux after the addition of 70 parts of a solution of chrome oxalic acid sodium salt which possesses a chromium content of 2.3%, for 7 hours. The chromium complex dyestuff thus formed is separated by the addition of sodium chloride, then filtered off and dried. It is a black-brown powder which dissolves in water with a violet colour and dyes wool from a weakly acid bath in violet shades of good fastness properties, especially outstanding light fastness.

The cobalt complex which can be obtained from the metal free dyestuff of this example by the method described in Example 1, is a red-brown powder which dissolves in water with a bluish-red shade and dyes wool from a weekly acid bath in fast Bordeaux shades.

*Example 7*

22.3 parts of 1-amino-2-hydroxy-3-chloro-benzene sulphonic acid-(5) are diazotized in the usual way and the diazotization mixture is then added to a solution of 19.9 parts of 3'-methyl-pyrazolo-(1',5':3,2)-quinazolone in 120 parts of methanol, 15 parts of a caustic soda solution ($d=1.46$) and 30 parts of a 25% ammonia solution, the temperature being held below 5° C. by the addition of ice. After coupling is complete the azo dyestuff formed of the formula

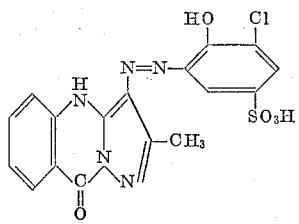

is separated by the addition of common salt and filtered off.

Wool is dyed with this dyestuff in an acid bath at 100° C. in orange-red shades. The dye bath is then treated with a potassium bichromate solution and heated for about 45 minutes. The shade of colour changes towards Bordeaux. The dyeing possesses good fastness properties.

*Example 8*

23.7 parts of 1-amino-2-hydroxy-benzene disulphonic acid-(3,5) are diazotized in the usual way and the diazotization mixture is then added to a solution of 25.3 parts of 3'-methyl-pyrazolo-(1',5':3,2)-7-amino quinazolone in a mixture of 175 parts of methanol, 15 parts of a caustic soda solution ($d=1.46$) and 30 parts of a 25% ammonia solution, the temperature being held below 5° C. by the addition of ice. After coupling has finished the azo dyestuff formed is separated off by the addition of salt and then filtered off.

For production of the copper complex the dyestuff is dissolved in 300 parts of water with the addition of soda to give a weakly alkaline reaction and the solution is then slowly added to another solution of 25 parts of crystalline copper sulphate, 15 parts of glacial acetic acid and 200 parts of water, warmed to 50° C. After the addition of salt the copper complex dyestuff formed is filtered off. It dissolves in water at neutral reaction with a bluish-red colour.

If the copper sulphate is replaced, in an otherwise similar manner of operation, by 29 parts of crystalline nickel sulphate, the nickel complex dyestuff is obtained, soluble in water with red colour.

The metal complex dyestuffs described in this example can be further modified by reactions at the amino group. For example if the copper complex dyestuff is dissolved at a neutral to weakly acid reaction in water and, after addition of a small quantity of a dispersing agent, 18.5 parts of cyanuric chloride are added at 0–5° C. while simultaneously treating with soda in accordance with the splitting off of hydrochloric acid, the copper complex is obtained of the dyestuff of the formula

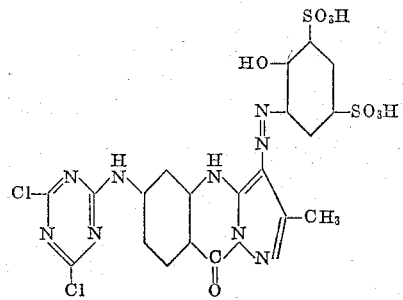

This dyestuff can be fixed in known manner on cotton by reaction with the fibre in the presence of alkali.

*Example 9*

18.8 parts of 1-amino-2-hydroxy-benzene sulphonamide-(5) are diazotized as described in Example 1 and the diazotization mixture is added at 0° C. to a solution of 24.3 parts of 3'-methyl-pyrazolo-(1',5':3,2) quinazolone carboxylic acid-(8) in 300 parts of water and 18 parts of a caustic soda solution ($d=1.46$), treated with 30 parts of soda. When the coupling is complete the azo dyestuff formed is separated off by the addition of sodium chloride and then filtered off. The dyestuff is then dissolved in 350 parts of hot water with the addition of 15 parts of soda and the solution treated at 90–100° C. within 15 minutes with a solution of 15 parts of potassium bichromate and 27.6 parts of glucose in 100 parts of water. The 1:1 chromium complex dyestuff thus obtained of the formula

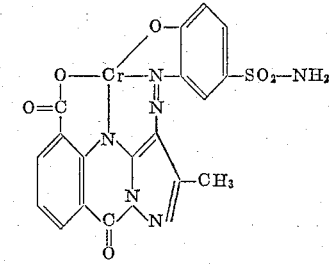

is precipitated by the addition of sodium chloride and neutralization with acetic acid and then filtered off. When dried it is a red powder which dissolves in water with a red colour and dyes wool from a weakly acid bath in clear red shades of outstanding fastness to light.

*Example 10*

3'-methyl - pyrazolo - (1',5':3,2) - quinazolone.—37.75 grams (¼ mol) of anthranilic acid hydrazide and 32.5 grams (¼ mol) acetoacetic acid ethyl ester are stirred at room temperature in 100 ml. methanol. The temperature slowly rises 8–10° C. and the anthranilic acid hydrazide goes completely into solution. After one hour it is treated with 25 grams of anhydrous soda whereupon a renewed rise of temperature is immediately to be observed; by immersing the reaction vessel in cold water the mixture is maintained at 35–40° C. until after about ½ hour the mixture solidifies to a thick, no longer stirrable crystal pulp. It is allowed to stand for a further 2 hours and filtered. The residue is washed on the suction filter with 100 ml. of warm methanol at 50° C. and then with 200 ml. of hot water. For further purification of the still weakly grey-green coloured crystal mass it is dissolved at the boil in 300 ml. water and 80 ml. hydrochloric acid ($d=1.19$), clarified once or twice with some charcoal until the solution is colourless and it is then treated with the hot solution of 85 grams of naphthalene-1,5-disulphonic acid sodium salt in 200 ml. of water. The naphthalene disulphonate of the pyrazolo-quinazolone separates soon in crystalline form. It is allowed to cool and filtered.

For the production of the free pyrazolo-quinazolone the salt is heated in 1 litre of water and gradually treated with a caustic soda solution until neutral. After filtering off with suction and drying the pure white product melts at 365–370° C. with decomposition. Yield: 39 grams.

$C_{11}H_9N_3O$ [199.2]: Calc.: C, 66.32; H, 4.55; N, 21.10; O, 8.03. Found: C, 66:10; H, 4.71; N, 21.09; O, 8.26.

*Example 11*

The product of Example 10 is also obtainable when 37.75 grams of anthranilic acid hydrazide, 32.5 grams of acetoacetic acid ethyl ester and 25 grams of anhydrous soda are simultaneously introduced into 100 ml. of methanol at room temperature. The mixture warms immediately and is maintained at the beginning by immersing in cold water at 35–40° C. After 1½ hours the material solidifies to a thick crystal pulp. The working up and purification are carried out into the same way as described in Example 10.

*Example 12*

3′-methyl-pyrazolo-(1′,5′:3,2)-quinazolone will likewise be obtained by the following process:

To a mixture of 50 grams of phenol and 0.5 ml. of a caustic soda solution there are slowly added dropwise 21 grams of freshly distilled diketene and the temperature maintained by immersing the reaction vessel in cold water, at 40–45° C. At the end it is cooled at 25° C., treated with 100 ml. of methanol and 37.75 grams (0.25 mol) of anthranilic acid hydrazide are introduced. The mixture gradually warms up and is maintained by external cooling at 35° C. The anthranilic acid hydrazide goes at first into solution; after about 45 minutes a fresh precipitate crystallizes out and after 90 minutes the content of the vessel solidifies to a stiff crystal pulp. This is allowed to stand for 5 hours at room temperature and then filtered off. The perfectly white residue is taken up in 200 ml. of methanol, heated to boiling, whereby the pyrazolo-quinazolone remains undissolved, and filtered. The product melts, after drying, at 365–370° C. (decomposition). Yield: 42 grams.

A similar result is achieved if acetoacetic acid phenyl ester, obtained from the reaction of phenol with diketene and still containing sodium phenolate is treated with 2 ml. of glacial acetic acid before the addition of the hydrazide and in otherwise similar manner, or if instead of methanol, benzene is used as reaction medium.

*Example 13*

37.75 grams (0.25 mol) of anthranilic acid hydrazide are finely distributed in 100 ml. of water and added at 20° C. to the reaction product of phenol with 21 grams of diketene treated with 2 ml. of glacial acetic acid (see Example 12). With rapid stirring the anthranilic acid hydrazide migrates immediately into the non-aqueous layer consisting of acetoacetic acid phenyl ester and phenol, which after about 20 minutes solidifies, to disintegrate in fine white crystals after a further 15 minutes. Simultaneously, the temperature rises to 45° C. To complete the reaction, the product is maintained for a further 2 hours at 45° C. and subsequently treated with 65 ml. of a caustic soda solution, 300 ml. of water and after 5 minutes with 80 grams of common salt. After cooling to 10° C., the reaction product which is present as the sodium salt in fine pale yellow crystals, is filtered off and washed on the filter with a 20% salt solution. The residue is then stirred in hot water adjusted to neutral reaction with hydrochloric acid, filtered off and dried. Yield: 42 grams.

*Example 14*

2 grams of 3′-methyl-pyrazolo-(1′,5′:3,2)-quinazolone are dissolved with 1.5 ml. of a caustic soda solution ($d=1.48$) in 50 ml. of water and, after the addition of 10 ml. of a 20% soda solution, treated with the diazonium salt prepared in the usual way from 1.8 grams of p-sulphanilic acid. The azo dyestuff formed is salted out and filtered off. It dyes wool from an acid bath in yellow shades.

*Example 15*

3′-methyl-pyrazolo-(1′,5′:3,2)-5-chloro-quinazolone.— 46.6 grams (0.25 mol) of 6-chloro-2-amino benzoic acid hydrazide and 32.5 grams (0.25 mol) of acetoacetic acid ethyl ester are stirred at room temperature in 200 ml. of methanol. After the hydrazide has dissolved within a few hours, it is treated with 25 grams of soda and stirred for 48 hours at room temperature. After this time a thick crystal pulp is present which is filtered off and washed with methanol and hot water. For further purification it is dissolved in 1 litre of water with 11 ml. of a caustic soda ($d=1.48$), clarified and treated dropwise in the hot with about 200 ml. of a 20% common salt solution. The product separates as the sodium salt in fine yellow needles. It is filtered and washed with a 5% common salt solution. The residue is heated in 800 ml. of water and treated with hydrochloric acid to give a neutral reaction. The 3′-methyl-pyrazolo-(1′,5′:3,2)-5-chloroquinazolone separates out as a fine white precipitate which is filtered off and dried. Melting point=360–370° C. (decomposition). Yield: 36 grams.

$C_{11}H_8ClN_3O$ [234.66]: Calc.: C, 56.30; H, 3.87; N, 17.91; Cl, 15.11. Found: C, 56.03; H, 3.44; N, 17.64; Cl, 15.41.

The 6-chloro-2-amino benzoic acid hydrazide used in this reaction, melting point=163–164° C. was produced, starting from 6-chloro-amino benzoic acid, by preparing first chloro-isatoic anhydride from it in hydrochloric acid solution with phosgene and then reacting this with excess hydrazine hydrate.

*Example 16*

3′-methyl-pyrazolo-(1′,5′:3,2)-7-amino-quinazolone.— 41.5 grams (0.25 mol) of 2,4-diamino benzoic acid hydrazide and 32.5 grams of acetoacetic acid ethyl ester are stirred at room temperature in 100 ml. of methanol. The temperature gradually rises to 8–10° C. As soon as a clear solution is present it is treated with 25 grams of soda whereupon a further rise of temperature is to be observed; by immersing the reaction vessel in cold water, heating of the material above 40° C. is avoided. After about ½ hour the separation of the reaction product begins which is present after 1 hour as a no longer stirrable crystal pulp. It is allowed to stand for a further 2 hours and filtered. The greenish coloured residue is heated with 200 ml. water and filtered. It is then dissolved at 80° C. in 2 litres of water and 100 ml. of hydrochloric acid, treated with charcoal, filtered and the filtrate neutralized with soda. The precipitate is filtered off, washed with water and dried. Yield: 36 grams; melting point 360–363° C. (decomposition).

$C_{11}H_{10}N_4O$ [214.22]: Calc.: C, 61.67; H, 4.71; N, 26.16. Found: C, 61.29; H, 4.98; N, 26.20.

For producing the diamino benzoic acid hydrazide, 4-nitro-2-aminobenzoic acid ethyl ester is hydrogenated in tetrahydrofuran in the presence of a nickel catalyst at 35° C. The 2,4-diamino benzoic acid ester obtained is reacted in ethylene glycol at 110° C. with hydrazine hydrate. The 2,4-diamino benzoic acid hydrazide thus obtained melts at 205–206° C.

*Example 17*

3′-methyl-pyrazolo-(1′,5′:3,2)-quinazolone - sulphonamide-(6).—21 grams of diketene are reacted according to the instructions of Example 12 with phenol and, after dilution with 100 ml. of methanol, 57.5 grams (0.25 mol) of 2-amino-5-sulphonamide benzoic acid hydrazide are added thereto and the mixture stirred for 24 hours. It is then filtered off and the precipitate washed first with methanol and then with water. For purification of the crude product it is dissolved in 300 ml. of a 7% aqueous ammonia solution, filtered after the addition of some charcoal and again precipitated by addition of 40 grams of ammonium bicarbonate. Yield: 25 grams; the product does not melt up to 385° C.

$C_{11}H_{10}N_4O_3S$ [287.28]: Calc.: C, 47.47; H, 3.62; N, 20.14. Found: C, 47.40; H, 3.65; N, 20.14.

Example 18

*3'-phenyl-pyrazolo - (1',5':3,2) - quinazolone.*—37.75 grams (0.25 mol) of anthranilic acid hydrazide and 48 grams (0.25 mol) of benzoyl acetic acid ethyl ester are stirred at room temperature in 200 ml. methanol. After 24 hours a clear solution is present which is treated with 25 grams of soda. The temperature rises within one hour from 25° C.–30° C. After 24 hours the reaction product is filtered off, washed with methanol and water, dried and recrystallized from 1200 ml. of glycol monomethyl ether. Yield: 15 grams; melting point 337–338° C.

$C_{16}H_{11}N_3O$ [261.27]: Calc.: C, 73.55; H, 4.24; N, 16.09. Found: C, 73.54; H, 4.46; N, 15.90.

Example 19

*3'-methyl-pyrazolo-(1',5': 3,2)-6,7-benzoquinazolone.*— 56.75 grams (0.25 mol) of 3-amino-β-naphtholic acid hydrazide and 32.5 grams (0.25 mol) of acetoacetic acid ethyl ester are stirred in 200 ml. of methanol. The pale yellow hydrazide gradually goes over into the deep-yellow coloured likewise difficultly soluble hydrazine. After 4 hours it is treated with 25 grams of soda. At first a strong brightening is observed. The next morning the material solidifies to a thick crystal pulp of the yellow reaction product. It is filtered and washed with methanol and water. For further purification the very difficultly soluble residue is boiled in 200 ml. of methanol. Yield: 39 grams. The product decomposes at 335–340° C. with dark colouration.

$C_{15}H_{11}N_3O$ [249.26]: Calc.: C, 72.27; H, 4.45; N, 16.86. Found: C, 72.65; H, 4.65; N, 16.52.

Example 20

*Pyrazolo-(1',5': 3,2) - quinazolone acetic acid methyl ester-(3').*—To a slurry of 37.8 grams (=¼ mol) of anthranilic acid hydrazide in 150 ml. of methanol, 50.5 grams (=¼ mol) of acetone dicarboxylic acid diethyl ester are added with stirring at room temperature. After about 1 hour the anthranilic acid hydrazide has gone completely into solution, the temperature having risen to about 10° C. The acyl hydrazone formed begins to crystallize out of the solution and after a further hour the material consists of a thick crystal pulp. 15 grams of anhydrous soda are then added and stirring is continued until no further reaction heat is freed. The reaction mixture is then cooled to 0–10° C. and the reaction product isolated by filtering off under suction. By reesterification of the reaction product with the methanol contained in the reaction mixture 50 grams of a lightly yellow coloured pyrazolo-(1',5':3,2)-quinazolone acetic acid methyl ester-(3') are obtained. The compound crystallizes from methanol in colourless felted needles and melts at 255° C. with decomposition.

$C_{13}H_{11}N_3O_3$ [257.2]: Calc.: C, 60.69; H, 4.31; N, 16.34; O, 18.66. Found: C, 60.76; H, 4.22; N, 16.12; O, 18.71.

Example 21

*1,3'-dimethyl-pyrazolo-(1',5': 3,2) - quinazolone.*—165 grams (=1 mol) of 2-methyl amino-benzoic acid hydrazide are slurried in 200 ml. of methanol and 130 grams (=1 mol) of acetoacetic acid ethyl ester are added with stirring at room temperature. With a temperature rise from 20° C. to about 40° C. the 2-methyl aminobenzoic acid hydrazide completely goes into solution in the course of 1–2 hours. The clear brown solution which now contains the acyl hydrazone is then treated with 53 grams of anhydrous soda. The cyclization which is now carried out proceeds likewise exothermically and the temperature of the reaction mixture is maintained for 2–3 hours without external application of heat or cooling at 30–40° C. When the temperature begins to fall below 30° C. the reaction has ended. The mixture is diluted with 400 to 500 ml. of ice water, the reaction product filtered off with suction and washed well with water. 188 grams (=.88% of the theoretical) are obtained of a lightly yellow coloured crude product. After recrystallization from methanol the compound is completely colourless and melts at 243–244° C. The compound gives a slightly soluble hydrochloride crystallizing as colourless felted needles.

$C_{12}H_{11}N_3O$ [213.2]: Calc.: C, 67.60; H, 5.20; N, 19.70; O, 7.50. Found: C, 67.93; H, 5.11; N, 19.64; O, 7.86.

Example 22

*3'-methyl-pyrazolo-(1',5': 3,2)-6-acetylamino - quinazolone.*—56 grams (0.25 mol) of 2-amino-5-acetylamino benzoic acid hydrazide and 32.5 grams of acetoacetic acid ethyl ester are stirred in 100 ml. of methanol until a clear solution is present. This is then treated with 25 grams of soda. The solution immediately becomes green in colour and the temperature gradually rises for about 10° C. and after about 1 hour the reaction product crystallizes out. It is filtered, washed first with methanol and then with hot water and dried. The yield amounts to 38 grams. The product may be recrystallized from dimethyl formamide (1 gram dissolves in 20 ml.). The substance does not melt up to 380° C.

$C_{13}H_{12}N_4O_2$ [256.26]: Calc.: C, 60.93; H, 4.72; N, 21.87. Found: C, 61.12; H, 5.08; N, 21.83.

For production of 2-amino-5-acetylamino-benzoic acid hydrazide, 2-amino-5-acetylamino-benzoic acid is first dissolved in water (¼ mol in 2 litres) with hydrochloric acid and transformed into the substituted isatoic acid anhydride with phosgene, which is subsequently reacted with hydrazine hydrate.

Example 23

*3',4'-dimethyl-pyrazolo-(1',5': 3,2)-quinazolone.*—37.75 grams (¼ mol) of anthranilic acid hydrazide and 36 grams (¼ mol) of α-methyl acetoacetic acid ethyl ester are stirred at room temperature in 100 ml. of methanol, until a clear solution is present and then over a period of 2 hours treated with 4 portions each of 1/10 mol of trimethyl amine in methanol solution. After 24 hours it is treated with 15 ml. of glacial acetic acid and 10 ml. of water and after ¼ hour the precipitate is filtered off. The weakly reddish coloured product is dissolved in 300 ml. of water and 50 ml. of hydrochloric acid (d=1.19) while hot, treated with charcoal and filtered. By neutralization of the almost colourless filtrate the reaction product is separated in a crystalline form, melting point 325° C. (decomposition; above 280° C. the colour of the substance gradually becomes deep red).

$C_{12}H_{11}N_3O$ [213.23]: Calc.: C, 67.59; H, 5.20; N, 19.71. Found: C, 67.63; H, 5.20; N, 19.80.

Example 24

*3' - methyl-pyrazolo-(1',5':3,2)-7-nitro-quinazolone.*— 21 grams of diketene are reacted according to the instrucitons of Example 12 with phenol, acidified with 2 ml. of glacial acetic acid, diluted with 100 ml. of dimethyl formamide and there are finally added 49.75 grams of 4-nitro-2-amino benzoic acid hydrazide. (Melting point 227–230° C. produced from the ester with hydrazine hydrate in ethylene glycol at 110° C.) The hydrazide gradually goes into solution. After 2 hours a very slow separation of fine yellow crystals is observed. The material is then warmed for 5 hours to 40° C. After cooling to 20° C. the reaction product is filtered off, washed on the filter first with a little dimethyl formamide then 3 times with 100 ml. methanol and dried. Yield: 20 grams. For further purification the product can be recrystallized from dimethyl formamide. At about 310° C. the substance decomposes without melting.

$C_{11}H_8N_4O_3$ [244.21]: Calc.: C, 54.10; H, 3.30; N, 22.94. Found: C, 54.46; H, 3.08; N, 22.90.

Example 25

*Pyrazolo-(1',5':3,2)-quinazolone-carboxylic acid ethyl ester-(3').*—37.8 grams (=¼ mol) of anthranilic acid hydrazide and 47 grams (=¼ mol) of oxalacetic acid diethyl ester are stirred in 150 ml. of methanol until complete solution of the anthranilic acid hydrazide. The temperature thereby rises for about 8–10° C. As soon as a clear solution is formed it is treated with 25 grams of anhydrous soda, whereupon a fresh temperature rise is observed. Heating of the reaction mixture above 40–45° C. is avoided by immersing the reaction vessel in cold water. When the temperature begins to fall below 30° C. the reaction has finished the reaction product is isolated by filtering off under suction. It is washed once with methanol and again with water. The yield of pyrazolo-(1',5':3,2)-quinazolone-carboxylic acid ethyl ester-(3') amounts to about 70% of the theoretical. The compound forms after recrystallizing from a great quantity of methanol, almost colourless crystals and decomposes with brown colouration at 275–280° C.

Example 26

*3'-methyl-pyrazolo-(1',5':3,2)-quinazolone carboxylic acid-(7).*—48.75 grams (¼ mol) of 2-amino-terephthalic acid mono-hydrazide-(1) are finely dispersed in 100 ml. of water and added with stirring to the mixture of acetoacetic acid phenyl ester and phenol (see Example 12), obtained from 50 grams of phenol and 21 grams of diketene. The hydrazide is immediately taken up in the nonaqueous layer which, with temperature rise, takes on a deep yellow colouration and solidifies to thick crumbs. It is held for a further 2 hours at 45° C. whereby the reaction mass gradually brightens to pale yellow and finally disintegrates into fine crystals and is treated instantly with 70 ml. of a caustic soda solution. At first a clear deep yellow solution is obtained from which, however, after a few seconds the reaction product crystallizes out (as the sodium salt). It is treated again with 25 grams of common salt, cooled to 0° C. and the precipitate filtered off. After stirring in hot water and addition of hydrochloric acid to give a weak acid reaction the free carboxylic acid is obtained. Yield: 35 grams. The product does not melt up to 360° C.

$C_{12}H_9N_3O_3$ [243.22]: Calc.: C, 59.26; H, 3.73; N, 17.28. Found: C, 59.10; H, 3.98; N, 17.45.

Example 27

*1-phenyl-3'-methyl-pyrazolo-(1',5':3,2)-quinazolone.*— To the mixture of acetoacetic acid phenyl ester and phenol obtained from 50 grams of phenol and 21 grams of diketene (see Example 12), 100 ml. of methanol and 2 ml. of glacial acetic acid are added. At room temperature and with stirring 56.8 grams of diphenyl amino carboxylic acid-(2)-hydrazide are introduced. With increase of temperature the hydrazide gradually goes into solution. When the whole is dissolved clearly it is heated for a further hour to 35–40° C. and then cooled by placing on ice at 0° C. The reaction product crystallizes out of the solution and can be filtered off. By washing with methanol it is freed from the associated phenol. The yield amounts to 35 grams. The 1-phenyl-3'-methyl-pyrazolo-(1',5':3,2)-quinazolone melts at 243–245° C.

$C_{17}H_{13}N_3O$ [275.3]: Calc.: C, 74.17; H, 4.76; N, 15.27; O, 5.81. Found: C, 74.51; H, 4.66; N, 15.34; O, 6.02.

The pyrazolo-quinazolones mostly melt considerably above 300° C. Since at this temperature a notable decomposition already occurs, the melting points given in the examples were established in such a manner that in the approximately indicated region after each temperature rise of 5° C. a fresh sample was brought into the copper block used.

Example 28

38 grams of anthranilic acid hydrazide are slurried in 100 ml. of methanol and 43 grams of cyclohexanone-(2)-carboxylic acid ethyl ester-(1) are added. After 2 hours stirring at room temperature a clear solution is present into which 15 grams of anhydrous soda are sprinkled. Stirring is continued for a further 4 hours at room temperature and 2 hours at 40° C. For working up it is diluted with 300–400 ml. of water, rendered weakly acid with diluted hydrochloric acid (pH 5–6) and the separated reaction product filtered off under suction. The reaction product is washed with water and methanol. After drying 35 grams are obtained of a weak yellow coloured compound, which may be recrystallized well from dimethyl formamide and decomposes above 300° C. with dark colouration the compound has the following constitution:

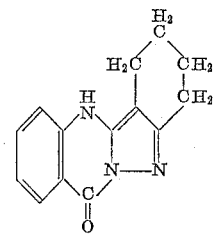

$C_{14}H_{13}N_3O$ [239.26]: Calc.: C, 70.28; H, 5.47; N, 17.56; O, 6.69. Found: C, 70.18; H, 5.28; N, 17.48; O, 6.88.

Example 29

42 grams of N-methyl-anthranilic acid hydrazide are reacted with 43 grams of cyclohexanone (2)-carboxylic acid ethyl ester exactly as described in Example 28 and worked up. 33 grams are obtained of a weakly yellow coloured compound of melting point 239–241° C. The substance has the following constitution:

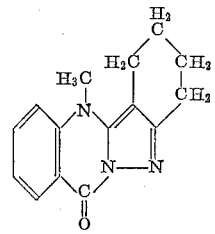

$C_{15}H_{15}N_3O$ [253.29]: Calc. C, 71.12; H, 5.97; N, 16.59. Found: C, 71.23; H, 6.07; N, 16.55.

Example 30

*3'-methyl-pyrazolo-(1',5':3,2) - quinazolone carboxylic acid-(8).*—44 grams (0.25 mol) of 2-amino-1,3-benzene dicarboxylic acid hydrazide-(1) are finely powdered and added to the reaction of phenol with 21 grams of diketene (see Example 12) treated with 1.8 ml. of glacial acetic acid. The temperature rises to about 31° C. To end the reaction, the reaction mixture is heated for a further 4 hours to 40° C. The yellow precipitate is filtered off under suction after cooling and boiled to remove the phenol, with methanol and benzene. 49 grams (80% of the theoretical) are obtained of a weakly yellow compound with the following constitution:

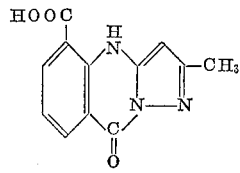

The substance does not melt up to 350° C.

For the production of 2-amino-1,3-benzene dicarboxylic acid hydrazide-(1) the corresponding amino dicarboxylic acid is treated with phosgene in bicarbonate alkaline solution and the isatoic acid anhydride thus formed is reacted with excess hydrazine hydrate. The mono-hydrazide melts at 247–250° C. with decomposition.

Example 31

3'-methyl-pyrazolo-(1',5':3,2)-quinazolone - sulphonic acid-(6).—54 grams (0.25 mol.) of 2-amino-benzoic acid sulphonic acid-(5) are dissolved in 500 ml. of water with 10 grams of sodium hydroxide. Phosgene is introduced into the solution with water cooling until no further amine can be detected. One part of isatoic acid anhydride precipitates under treatment with phosgene. A further quantity may be isolated by salting out with 125 grams of common salt. The reaction product is introduced with cooling into 35 ml. of hydrazine hydrate and then heated to 100° C. After cooling the hydrazide precipitates.

21 grams of diketene are reacted according to the instructions of Example 12 with phenol and after dilution with water the above described hydrazide is introduced. After 24 hours' stirring it is filtered off under suction and the quinazolone heated for purification three times in 150 ml. water and 15 ml. hydrochloric acid. Yield: 41 grams (59% of the theoretical) calculated on the employed 2-amino benzoic acid sulphonic acid-(5). The product does not melt up to 360° C.

Example 32

Bis-3'-methyl-pyrazolo-(1',5':3,2) - quinazolone.—74.5 grams (0.25 mol.) of benzidine-o-dicarboxylic acid-dihydrazide are reacted with acetoacetic acid phenyl ester, from phenol and 50 grams of diketene (analogous to the description of Example 12), and then heated for 4 hours to 40° C. The crystalline precipitate is filtered off under suction and transformed for purification into the hydrochloride with 500 ml. of semi-concentrated hydrochloric acid in the hot. The free pyrazolo quinazolone is obtained from the salt by heating in 1.5 litres of water. The last traces of phenol may be removed by boiling out with methanol.

Yield: 63 grams (64% of the theoretical) of a compound of the following constitution:

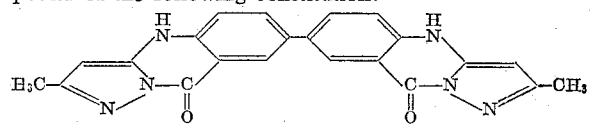

$C_{22}H_{16}N_6O_2$ [396.40]: Calc. C, 66.65; H, 4.07; N, 21.20. Found: C, 66.27; H, 4.31; N, 20.95.

The substance does not melt up to 360° C.

The starting hydrazide was obtained from benzidine-o-dicarboxylic acid dimethyl ester by heating in excess hydrazine hydrate.

Example 33

22.8 parts of 1,3' - dimethyl - 4' - amino - pyrazolo-(1',5':3,2)-quinazolone are dissolved in 100 parts of water and 25 parts of hydrochloric acid ($d=1.19$) and diazotized with the addition of ice at 0° C. The diazo solution thus obtained is poured into a solution of 24.5 parts of 2-amino-8-hydroxy-naphthalene sulphonic acid-(6) in 500 parts of water and 25 parts of hydrochloric acid ($d=1.19$) at 35–40° C. The coupling solution was adjusted by the addition of sodium acetate to a pH value of about 3. After the coupling is complete the azo dyestuff formed of the formula

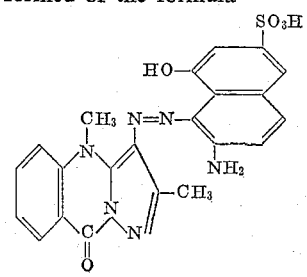

is filtered off and dried. It is a brown red powder which dissolve in water with a blue red colour and dyes wool from an acid bath in bluish red shades of good fastness properties.

We claim:
1. A dyestuff selected from the class consisting of a monoazo dyestuff of the formula

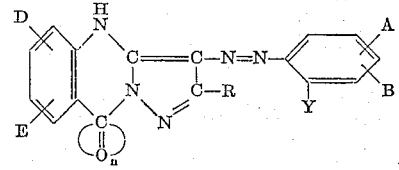

class consisting of hydrogen, —NO₂, —Cl, —SO₃H, —SO₂NH₂, —NH₂, —COOH, dichlorotriazinylamino, lower alkoxy and lower alkyl sulfone, and A and B forming together the group —O—CH₂—SO₂— being attached with —O— to the p-position and with —SO₂— to the m-position relative to the position of the azo bridge in the benzene nucleus, R is a radical selected from the class consisting of hydrogen, carbo-lower-alkoxy methylene, lower alkyl, —COOH, —C₆H₅, n is an integer ranging from 0 to 1, Y is a group selected from the class consisting of H, Cl, —OH, lower alkoxy and —COOH; and the metal complex compounds of said azo dyestuffs selected from the class consisting of the copper, chromium and cobalt metal complex compounds.

2. A chromium complex of an azo dyestuff of the formula

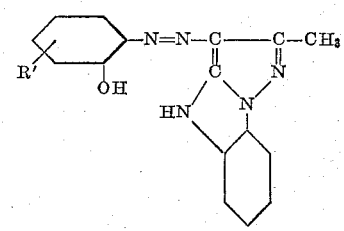

wherein R' is a sulfonamide group.

3. A cobalt complex of an azo dyestuff of the formula

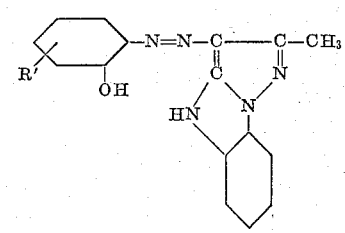

wherein R' is a sulfonamide group.

4. The chromium complex compound of the dyestuff of the formula

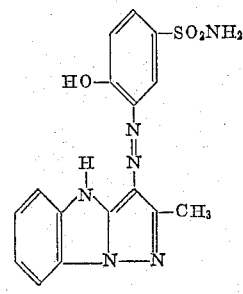

5. The chromium complex compound of the dyestuff of the formula
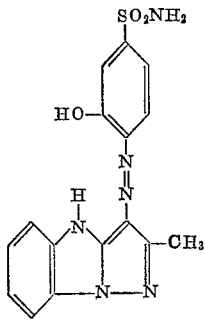
6. The dyestuff of the formula
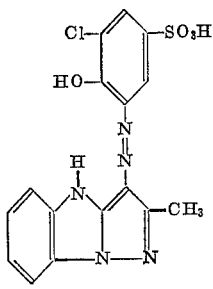
7. The chromium complex compound of the dyestuff of the formula
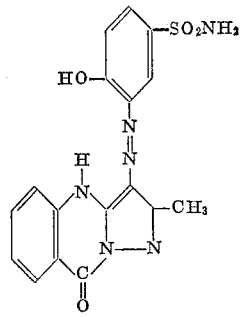
8. The dyestuff of the formula
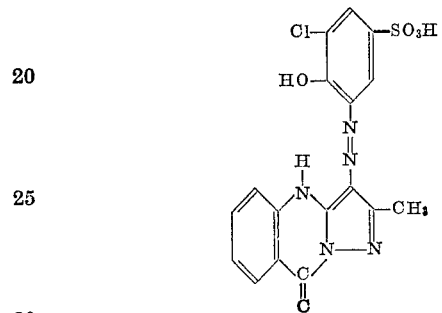
References Cited in the file of this patent
UNITED STATES PATENTS
| | | |
|---|---|---|
| 2,569,418 | Kellog | Sept. 25, 1951 |
| 2,593,890 | Kellog | Apr. 22, 1952 |
| 2,880,202 | Enders | Mar. 31, 1959 |
| 2,883,374 | Enders | Apr. 21, 1959 |
| 2,937,284 | Hitchings et al. | May 17, 1960 |